US011136111B2

(12) United States Patent
Schlipf et al.

(10) Patent No.: US 11,136,111 B2
(45) Date of Patent: Oct. 5, 2021

(54) WING FOR AN AIRCRAFT

(71) Applicant: Airbus Operations GmbH, Hamburg (DE)

(72) Inventors: Bernhard Schlipf, Hamburg (DE); Florian Lorenz, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 16/227,699

(22) Filed: Dec. 20, 2018

(65) Prior Publication Data

US 2019/0193837 A1    Jun. 27, 2019

(30) Foreign Application Priority Data

Dec. 21, 2017   (DE) ..................... 10 2017 130 910.1

(51) Int. Cl.
*B64C 13/28*     (2006.01)
*B64C 9/02*      (2006.01)
*B64C 9/22*      (2006.01)

(52) U.S. Cl.
CPC ................ *B64C 13/28* (2013.01); *B64C 9/02* (2013.01); *B64C 9/22* (2013.01)

(58) Field of Classification Search
CPC .... B64C 9/22; B64C 9/26; B64C 9/02; B64C 13/28; B64C 3/38; B64C 9/24; B64D 2045/001
See application file for complete search history.

(56) References Cited

U.S. PATENT DOCUMENTS

| 7,048,234 B2* | 5/2006 | Recksiek ........... B64D 45/0005 244/213 |
| 8,104,710 B2* | 1/2012 | Harvey ................. F16H 37/124 244/99.2 |
| 8,511,619 B2* | 8/2013 | Mann ........................ B64C 9/22 244/214 |

(Continued)

FOREIGN PATENT DOCUMENTS

| DE | 3321128 A1 | 12/1984 |
| DE | 10 2011 117706 A1 | 5/2013 |

(Continued)

OTHER PUBLICATIONS

Extended European Search Report for Application No. 18211800.0 dated Apr. 1, 2019

(Continued)

*Primary Examiner* — Richard R. Green
*Assistant Examiner* — Arfan Y. Sinaki
(74) *Attorney, Agent, or Firm* — Jenkins, Wilson, Taylor & Hunt, P.A.

(57) ABSTRACT

A wing for an aircraft, including a main wing, a slat, and a connection assembly movably connecting the slat to the main wing, such that the slat is movable between a retracted position and at least one extended position. The connection assembly includes a first connection station and a second connection station spaced apart from the first connection station in a wing span direction. The object, to prevent the slat from skewing, is achieved in that the connection assembly includes a sync shaft coupling the first connection station to the second connection station for sync movement of the first and second connection stations.

11 Claims, 3 Drawing Sheets

(56) References Cited

U.S. PATENT DOCUMENTS

| | | | | |
|---|---|---|---|---|
| 2005/0029407 A1* | 2/2005 | Pohl | ............... | B64C 9/16 244/221 |
| 2008/0229851 A1 | 9/2008 | Jones et al. | | |
| 2010/0163685 A1 | 7/2010 | Vormezeele et al. | | |
| 2018/0312243 A1* | 11/2018 | Vervliet | ............... | F16H 37/124 244/99.2 |

FOREIGN PATENT DOCUMENTS

| | | | | |
|---|---|---|---|---|
| DE | 102011117706 A1 * | 5/2013 | ............... | B64C 9/16 |
| DE | 10 2014 019134 A1 | 6/2016 | | |
| DE | 102014019134 A1 * | 6/2016 | ............ | B64C 13/34 |
| EP | 1 462 361 A1 | 9/2004 | | |
| EP | 1 985 893 A2 | 10/2008 | | |
| EP | 2116467 A1 * | 11/2009 | ............... | B64C 9/24 |
| EP | 2 202 146 A2 | 6/2010 | | |
| EP | 2 902 314 A1 | 8/2015 | | |
| EP | 3 501 978 B1 | 3/2021 | | |

OTHER PUBLICATIONS

German Search Report for Application No. 10 2017 130 910.1 dated Oct. 22, 2018.

* cited by examiner

WING FOR AN AIRCRAFT

CROSS-REFERENCE TO RELATED APPLICATION

This application claims priority to German Patent Application No. 10 2017 130 910.1 filed Dec. 21, 2017, the entire disclosure of which is incorporated by reference herein.

TECHNICAL FIELD

The disclosure herein relates to a wing for an aircraft. A further aspect of the disclosure herein relates to an aircraft comprising such a wing.

BACKGROUND

A wing comprises a main wing, a slat, and a connection assembly movably connecting the slat to the main wing, such that the slat can be moved between a retracted position and at least one extended position. The connection assembly comprises at least a first connection station and a second connection station spaced apart from the first connection station in a wing span direction. The connection assembly might also comprise further connection stations, e.g. a third connection station or a third and a fourth connection station.

The first connection station comprises a first linkage, a first slat track and a first drive station. The first linkage is pivotally mounted to the main wing via a first joint, and is pivotally mounted to the slat via a second joint. The first slat track is guided at the main wing for movement along a predefined path, and is pivotally mounted to the slat via a third joint. Preferably, the first slat track extends in an elongate manner along a first longitudinal axis and is guided via rollers at the main wing for translational movement along the path extending along the first longitudinal axis. Preferably, the first slat track has a straight form, i.e. extends along a straight first longitudinal axis. The first drive station includes a first input section coupled to a drive shaft, a first gear unit, and a first output section drivingly coupled to the first slat track for moving the first slat track along the path.

The second connection station comprises a second linkage, a second slat track and a second drive station. The second linkage is pivotally mounted to the main wing via a fourth joint, and is pivotally mounted to the slat via a fifth joint. The second slat track is guided at the main wing for movement along a predefined path, and is pivotally mounted to the slat via a sixth joint. Preferably, the second slat track extends in an elongate manner along a second longitudinal axis and is guided via rollers at the main wing for translational movement along the path extending along the second longitudinal axis. Preferably, the second slat track has a straight form, i.e. extends along a straight second longitudinal axis. The second drive station includes a second input section coupled to the drive shaft, a second gear unit, and a second output section drivingly coupled to the second slat track for moving the second slat track along the path.

The first and second gear units transform high rotational speed with low torque from the first and second input sections (i.e. from the drive shaft) into low rotational speed with high torque at the first and second output sections. The drive shaft is preferably driven by a central drive unit, e.g. a hydraulic and/or electric motor arrangement. The first, second, third, fourth, fifth and sixth joints preferably are formed as spherical joints or as universal joints and are preferably configured to pivot about axes of rotation in parallel to one another and/or in parallel to the wing span direction and/or in parallel to a leading edge of the main wing.

Similar wings are known in the art. For such wings skew cases are possible where the first and second connection stations do not move in sync and the slat might be skewed about a vertical axis.

SUMMARY

Therefore, an object of the disclosure herein is to prevent such skew cases of the slat.

This object is achieved in that the connection assembly comprises a sync shaft coupling the first connection station to the second connection station for sync movement of the first and second connection stations. The sync shaft is preferably a rotating shaft and is coupled to the first and second connection stations preferably via spherical joints or universal joints to avoid constraint forces e.g. in cases when the wing bends under aerodynamic loads. In such a way, the sync shaft provides that the first and second connection stations move in sync, i.e. in parallel, so that due to the first and second connection stations being spaced apart in the wing span direction, the slat is prevented from skewing.

Besides the first and second connection stations the connection assembly might comprise further connection stations. For example, a third connection station might be provided including a third linkage and/or a third slat track. Additionally, a fourth connection station might be provided including a fourth linkage and/or a fourth slat track. The sync shaft might couple only the first and second connection stations, or might couple also the third and/or fourth connection station to the first and second connection stations.

According to a preferred embodiment, the first output section comprises a first drive pinion engaging a first rack provided at the first slat track for driving the first slat track along its corresponding path. Additionally or alternatively, the second output section comprises a second drive pinion engaging a second rack provided at the second slat track for driving the second slat track along its corresponding path. Such a rack-and-pinion drive of the slat tracks is very efficient and reliable.

According to another preferred embodiment, the sync shaft couples the first output section to the second output section for sync movement of the first and second output sections. Coupling the first and second output sections is a very efficient and reliable way to prevent skew of the slat.

In particular, it is preferred that the sync shaft couples the first drive pinion to the second drive pinion for sync movement of the first and second drive pinions. First and second drive pinions might be fixedly mounted to the sync shaft or might engaged the sync shaft in a geared manner. This represents a simple way to prevent skew.

Further, it is preferred that the sync shaft is arranged coaxially with the drive shaft. For example, the drive shaft might run inside the sync shaft. This allows a very compact design.

Alternatively, the sync shaft might also be arranged parallelly spaced apart from the drive shaft. This allows the sync shaft to be designed independent from the drive shaft.

According to an alternative embodiment, the sync shaft couples the first linkage to the second linkage for sync movement of the first and second linkages. Coupling the first and second linkages represents a further efficient and reliable way to prevent skew of the slat.

In particular, it is preferred that the sync shaft is arranged such that its axis of rotation coincides with the axes of rotation of the first and fourth joints. This means, the sync shaft is aligned with the first and fourth joints at the main wing and rotates about its central axis relative to the main wing, which represents a reliable and efficient arrangement of the sync shaft. Alternatively, the sync shaft might also be arranged parallel spaced apart from the axes of rotation of the first and fourth joints so that it rotates about the first and fourth joints spaced apart by a certain radius.

According to a further preferred embodiment, the first linkage comprises a first link element that is mounted with its first end to the main wing via the first joint and that is mounted with its opposite second end to the slat via the second joint. Additionally or alternatively, the second linkage comprises a second link element that is mounted with its first end to the main wing via the fourth joint and that is mounted with its opposite second end to the slat via the fifth joint. In such a way, the linkages might be formed very simple by including only one link element.

In particular, it is preferred that the first link element is mounted to the slat via a first bar that is with its one end fixedly mounted to the slat and that is with its opposite other end pivotally mounted to the first link element via the second joint. Additionally or alternatively, the second link element is mounted to the slat via a second bar that is with its one end fixedly mounted to the slat and that is with its opposite other end pivotally mounted to the second link element via the fifth joint. Such first and second bars might be fixed parts of the slat or might be parts of the connection assembly that are rigidly mounted to the slat. By including such bars the path of movement and orientation of the slat can be influenced as required.

Further, it is preferred that the sync shaft couples the first link element to the second link element. Preferably, the sync shaft couples the first and second link elements at the first and fourth joints, but may also couple the first and second link elements at the second and fifth joints or at intermediate positions between the first and second joints and the fourth and fifth joints, respectively. In such a way, a simple and efficient arrangement of the sync shaft is provided.

According to a further preferred embodiment, the first linkage is formed as a four-bar-linkage comprising two link elements that are pivotally mounted to the main wing at positions spaced apart from one another in a wing chord direction, and that are pivotally mounted to the slat at positions spaced apart from one another in the wing chord direction. Additionally or alternatively, the second linkage is formed as a four-bar-linkage comprising two link elements that are pivotally mounted to the main wing at positions spaced apart from one another in the wing chord direction, and that are pivotally mounted to the slat at positions spaced apart from one another in the wing chord direction. Such four bar linkage relates to an efficient and reliable connection design.

According to another preferred embodiment, the sync shaft comprises a first shaft portion and a second shaft portion connected to one another via a coupling mechanism that provides torsional decoupling of the first and second shaft portions during normal operation of the connection assembly, and that provides torsional coupling of the first and second shaft portions upon failure of one of the first and second drive stations. In such a way, constraint forces e.g. due to wing bending can be avoided during normal operation, while upon failure of one drive station the other drive station may still couple to the one drive station and drive the slat without skew.

In particular, it is preferred that the coupling mechanism is formed as a clutch, as a torsional play mechanism, such as a feather key connection, where a feather key has a certain torsional play within a corresponding groove, or as a torsional compliance element having certain torsional elasticity. These represent simple and effective examples of coupling mechanisms.

A further aspect of the disclosure herein relates to an aircraft comprising a wing according to any of afore-described embodiments. The features and advantages described above in connection with the wing apply vis-à-vis for the aircraft.

BRIEF DESCRIPTION OF THE DRAWINGS

Preferred embodiments of the disclosure herein are described hereinafter in more detail by example drawings. The drawings show in.

DETAILED DESCRIPTION

Figure 1:
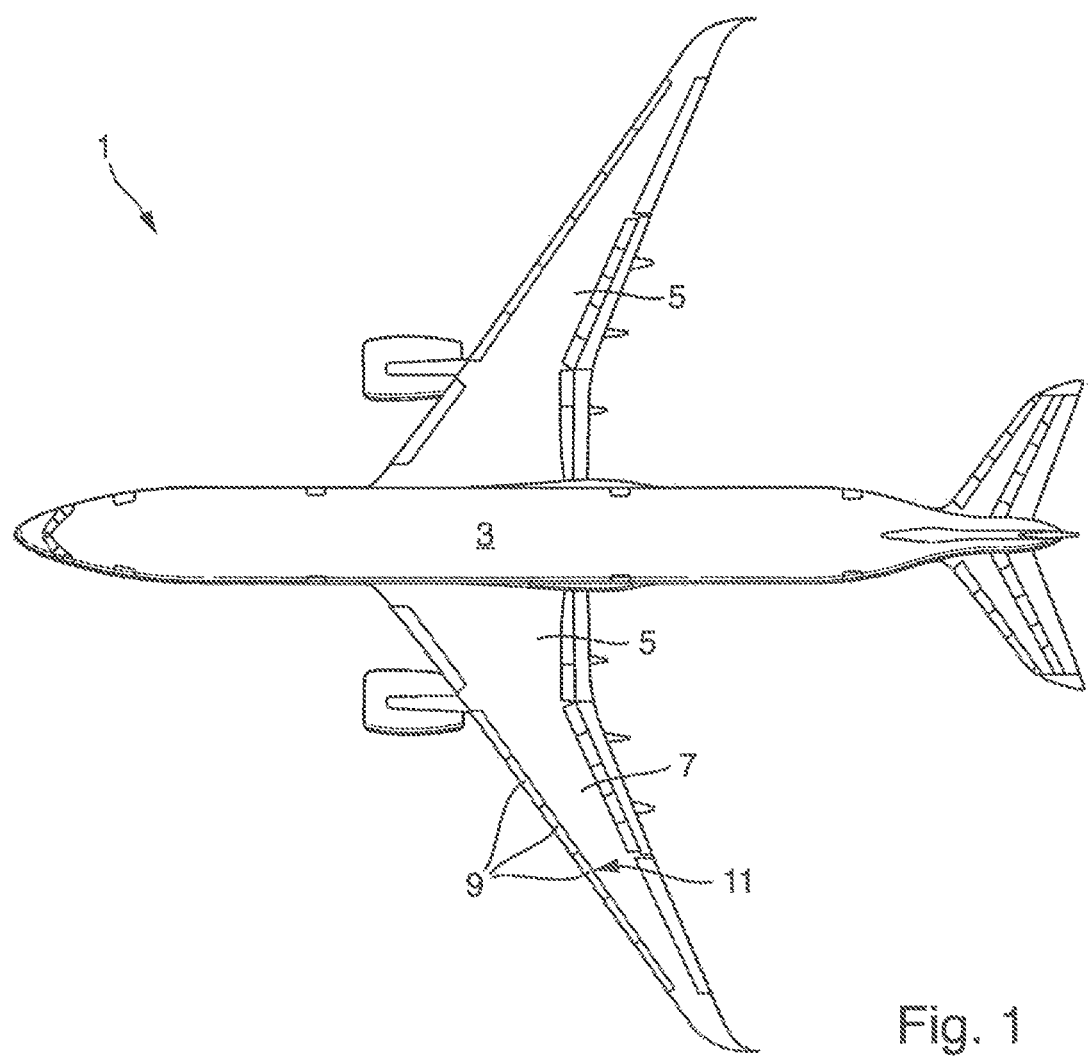
FIG. 1 a top view of an aircraft according to the disclosure herein.

In FIG. 1 an aircraft 1 according to an embodiment of the disclosure herein is shown. The aircraft 1 comprises a fuselage 3 and wings 5 mounted to the fuselage 3. Each wing 5 comprises a main wing 7, a slat 9, and a connection assembly 11 movably connecting the slat 9 to the main wing 7, such that the slat 9 can be moved between a retracted position and at least one extended position.

Figure 2:
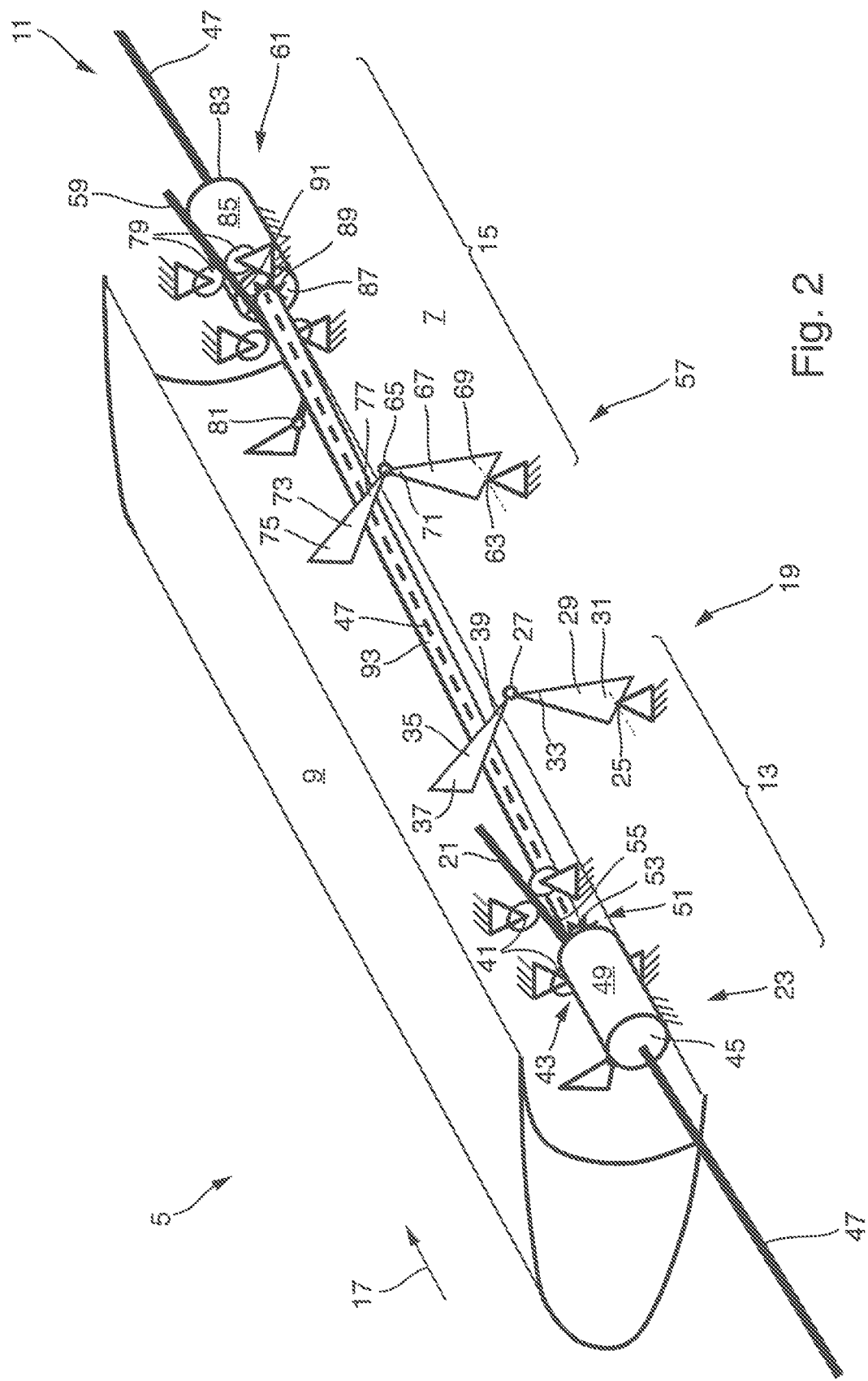
FIG. 2 a schematic illustration of a wing according to a first embodiment of the disclosure herein.
Figure 3:
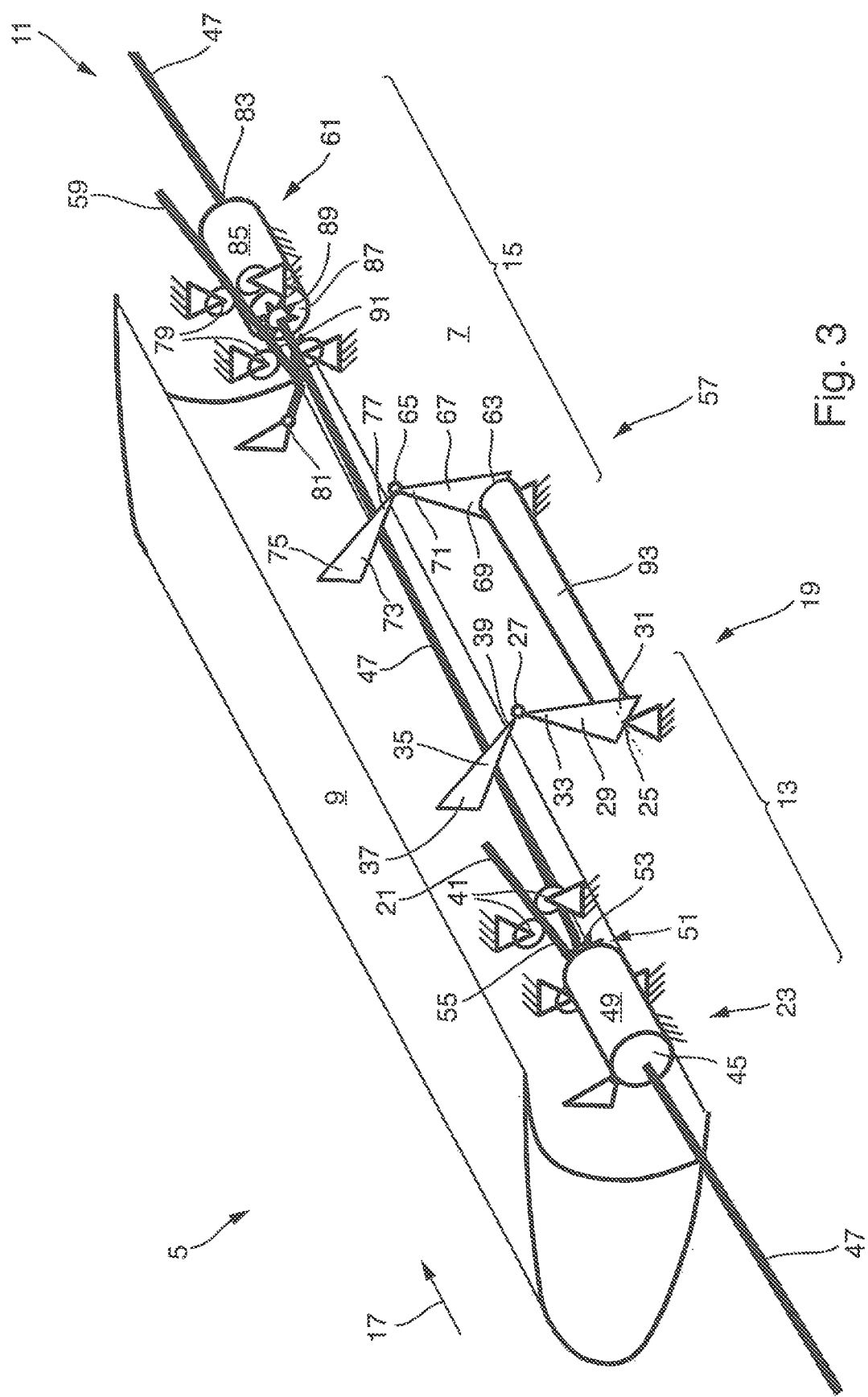
FIG. 3 a schematic illustration of a wing according to a second embodiment of the disclosure herein.

FIGS. 2 and 3 illustrate two different embodiments how the wings 5 shown in FIG. 1 might be formed. Both embodiments have in common that the connection assembly 11 comprises a first connection station 13 and a second connection station 15 spaced apart from the first connection station 13 in a wing span direction 17.

The first connection station 13 comprises a first linkage 19, a first slat track 21 and a first drive station 23. The first linkage 19 is pivotally mounted to the main wing 7 via a first joint 25, and is pivotally mounted to the slat 9 via a second joint 27. Specifically, the first linkage 19 comprises a first link element 29 that is mounted with its first end 31 to the main wing 7 via the first joint 25 and that is mounted with its opposite second end 33 to the slat 9 via the second joint 27 and a first bar 35. The first bar 35 is with its one end 37 fixedly mounted to the slat 9 and is with its opposite other end 39 pivotally mounted to the first link element 29 via the second joint 27. The first slat track 21 is guided at the main wing 7 for movement along a predefined path formed by first rollers 41, and is pivotally mounted to the slat 9 via a third joint 43. The first drive station 23 includes a first input section 45 coupled to a drive shaft 47, a first gear unit 49, and a first output section 51 drivingly coupled to the first slat track 21 for moving the first slat track 21 along the path. The first output section 51 comprises a first drive pinion 53 engaging a first rack 55 provided at the first slat track 21 for driving the first slat track 21 along the path.

Similarly, the second connection station 15 comprises a second linkage 57, a second slat track 59 and a second drive station 61. The second linkage 57 is pivotally mounted to the main wing 7 via a fourth joint 63, and is pivotally mounted to the slat 9 via a fifth joint 65. Specifically, the second linkage 57 comprises a second link element 67 that is mounted with its first end 69 to the main wing 7 via the fourth joint 63 and that is mounted with its opposite second end 71 to the slat 9 via the fifth joint 65 and a second bar 73. The second bar 73 is with its one end 75 fixedly mounted to the slat 9 and is with its opposite other end 77 pivotally mounted to the second link element 67 via the fifth joint 65. The second slat track 59 is guided at the main wing 7 for movement along a predefined path formed by second rollers 79, and is pivotally mounted to the slat 9 via a sixth joint 81. The second drive station 61 includes a second input section 83 coupled to the drive shaft 47, a second gear unit 85, and a second output section 87 drivingly coupled to the second slat track 59 for moving the second slat track 59 along the path. The second output section 87 comprises a second drive pinion 89 engaging a second rack 91 provided at the second slat track 59 for driving the second slat track 59 along its corresponding path.

The two embodiments shown in FIGS. 2 and 3 further have in common that the connection assembly 11 comprises a rotating sync shaft 93 coupling the first connection station 13 to the second connection station 15 for sync movement of the first and second connection stations 13, 15 in order to prevent skew of the slat 9.

According to the first embodiment shown in FIG. 2, the sync shaft 93 couples the first output section 51 to the second output section 87 for sync movement of the first and second output sections 51, 87. Specifically, the sync shaft 93 couples the first drive pinion 53 to the second drive pinion 89 for sync movement of the first and second drive pinions 53, 89. First and second drive pinions 53, 89 are fixedly mounted to the sync shaft 93. Further, the sync shaft 93 is arranged coaxially around the drive shaft 47.

Alternatively, according to the second embodiment shown in FIG. 3 the sync shaft 93 couples the first linkage 19 to the second linkage 57 for sync movement of the first and second linkages 19, 57. Specifically, the sync shaft 93 couples the first link element 29 to the second link element 67 and is arranged such that its axis of rotation coincides with the axes of rotation of the first and fourth joints 25, 63.

While at least one exemplary embodiment of the invention(s) herein is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft, comprising
   a main wing;
   a slat; and
   a connection assembly movably connecting the slat to the main wing, such that the slat is movable between a retracted position and at least one extended position;
   the connection assembly comprising
      a drive shaft configured to generate a rotary input having a first rotational speed and a first torque;
      a first connection station comprising:
         a first linkage pivotally mounted to the main wing via a first joint and pivotally mounted to the slat via a second joint;
         a first slat track that is guided at the main wing for movement along a predefined path, and that is pivotally mounted to the slat via a third joint; and
         a first drive station including a first gear unit, the first gear unit comprising a first input section connected to and configured to be driven by the drive shaft and a first output section drivingly coupled to the first slat track, wherein the first gear unit is configured to transform the rotary input from the drive shaft having the first rotational speed and the first torque into a first rotary output at the first output section having a second rotational speed that is relatively lower than the first rotational speed and a second torque that is relatively higher than the first torque;
      a second connection station spaced apart from the first connection station in a wind span direction, the second connection station comprising:
         a second linkage pivotally mounted to the main wing via a fourth joint and pivotally mounted to the slat via a fifth joint;
         a second slat track that is guided at the main wing for movement along a predefined path, and that is pivotally mounted to the slat via a sixth joint; and
         a second drive station including a second gear unit, the second gear unit comprising a second input section connected to and configured to be driven by the drive shaft and a second output section drivingly coupled to the second slat track, wherein the second gear unit is configured to transform the rotary input from the drive shaft having the first rotational speed and the first torque into a second rotary output at the second output section having the second rotational speed and the second torque; and
      a sync shaft coupling the first output section to the second output section, wherein the sync shaft is configured for rotation at the second rotational speed for sync movement of the first and second output sections.

2. The wing according to claim 1, wherein the first output section comprises a first drive pinion engaging a first rack at the first slat track for driving the first slat track along the path, and/or
   wherein the second output section comprises a second drive pinion engaging a second rack at the second slat track for driving the second slat track along the path.

3. The wing according to claim 2,
   wherein the sync shaft couples the first drive pinon to the second drive pinion for sync movement of the first and second drive pinions.

4. The wing according to claim 1, wherein the sync shaft is rotatable about an axis of rotation that is coaxial with an axis of rotation of the drive shaft.

5. The wing according to claim 1, wherein the sync shaft is parallelly spaced apart from the drive shaft.

6. The wing according to claim 1, wherein the first linkage comprises a first link element mounted to the main wing via the first joint and mounted to the slat via the second joint, and/or
   wherein the second linkage comprises a second link element mounted to the main wing via the fourth joint and mounted to the slat via the fifth joint.

7. The wing according to claim 6, wherein the first link element is mounted to the slat via a first bar that is fixedly mounted to the slat and that is pivotally mounted to the first link element via the second joint, and/or wherein the second link element is mounted to the slat via a second bar that is fixedly mounted to the slat and that is pivotally mounted to the second link element via the fifth joint.

8. The wing according to claim 1, wherein the first linkage is formed as a four-bar-linkage comprising two link elements that are pivotally mounted to the main wing spaced apart from one another and that are pivotally mounted to the slat spaced apart from one another, and/or
wherein the second linkage is formed as a four-bar-linkage comprising two link elements that are pivotally mounted to the main wing spaced apart from one another and that are pivotally mounted to the slat spaced apart from one another.

9. The wing according to claim 1, wherein the sync shaft comprises a first shaft portion and a second shaft portion connected to one another via a coupling mechanism that provides:
torsional decoupling of the first and second shaft portions during normal operation of the connection assembly; and
torsional coupling of the first and second shaft portions upon failure of one of the first and second drive stations.

10. The wing according to claim 9, wherein the coupling mechanism is a clutch, a torsional play mechanism, or a torsional compliance element.

11. An aircraft comprising a wing, the wing comprising
a main wing;
a slat; and
a connection assembly movably connecting the slat to the main wing, such that the slat is movable between a retracted position and at least one extended position;
the connection assembly comprising:
a drive shaft configured to generate a rotary input having a first rotational speed and a first torque;
the first connection station comprising:
a first linkage pivotally mounted to the main wing via a first joint and pivotally mounted to the slat via a second joint;
a first slat track that is guided at the main wing for movement along a predefined path, and that is pivotally mounted to the slat via a third joint; and
a first drive station including a first gear unit, the first gear unit comprising a first input section connected to and configured to be driven by the drive shaft and a first output section drivingly coupled to the first slat track, wherein the first gear unit is configured to transform the rotary input from the drive shaft having the first rotational speed and the first torque into a first rotary output at the first output section having a second rotational speed that is relatively lower than the first rotational speed and a second torque that is relatively higher than the first torque;
a second connection station spaced apart from the first connection station in a wine span direction, the second connection station comprising:
a second linkage pivotally mounted to the main wing via a fourth joint and pivotally mounted to the slat via a fifth joint;
a second slat track that is guided at the main wing for movement along a predefined path, and that is pivotally mounted to the slat via a sixth joint; and
a second drive station including a second gear unit, wherein the second gear unit comprises a second input section connected to and configured to be driven by the drive shaft and a second output section drivingly coupled to the second slat track, wherein the second gear unit is configured to transform the rotary input from the drive shaft having the first rotational speed and the first torque into a second rotary output at the second output section having the second rotational speed and the second torque; and
a sync shaft coupling the first output section to the second output section, wherein the sync shaft is configured for rotation at the second rotational speed for sync movement of the first and second output sections.

* * * * *